(12) United States Patent
Wu et al.

(10) Patent No.: US 12,530,189 B1
(45) Date of Patent: Jan. 20, 2026

(54) MACHINE LEARNING MODEL SIGNATURES

(71) Applicant: Amazon Technologies, Inc, Seattle, WA (US)

(72) Inventors: Yue Wu, Torrance, CA (US); Pradeep Natarajan, Chicago, IL (US); Rajiv M Reddy, Bellevue, WA (US); Premkumar Natarajan, Rolling Hills Estates, CA (US); Xu Zhang, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 17/854,484

(22) Filed: Jun. 30, 2022

(51) Int. Cl.
*G06F 9/44* (2018.01)
*G06F 8/71* (2018.01)
*G06N 20/00* (2019.01)

(52) U.S. Cl.
CPC .............. *G06F 8/71* (2013.01); *G06N 20/00* (2019.01)

(58) Field of Classification Search
CPC .................................. G06F 8/71; G06N 20/00
See application file for complete search history.

(56) References Cited

U.S. PATENT DOCUMENTS

| | | | |
|---|---|---|---|
| 2018/0197089 A1* | 7/2018 | Krasser | G06N 3/044 |
| 2019/0102675 A1* | 4/2019 | Biswas | G06N 3/045 |
| 2019/0258783 A1* | 8/2019 | Mehta | G06N 20/00 |
| 2020/0034663 A1* | 1/2020 | Michiels | G06F 11/10 |
| 2020/0233979 A1* | 7/2020 | Tahmasebi Maraghoosh | G06N 3/04 |
| 2020/0311248 A1* | 10/2020 | Dwarakanath | G06V 10/774 |
| 2021/0019605 A1* | 1/2021 | Rouhani | G06N 7/01 |
| 2021/0125057 A1* | 4/2021 | Choi | G06N 3/04 |
| 2022/0012312 A1* | 1/2022 | Poddar | G06N 3/045 |
| 2022/0019663 A1* | 1/2022 | Stapleton | G06F 21/554 |
| 2022/0300842 A1* | 9/2022 | Charette | G06F 21/16 |
| 2023/0105309 A1* | 4/2023 | Davis | H04L 9/0894 713/176 |

* cited by examiner

*Primary Examiner* — Bradley A Teets
*Assistant Examiner* — Lenin Paulino
(74) *Attorney, Agent, or Firm* — Pierce Atwood LLP

(57) ABSTRACT

A system and techniques for configuring a trained model to dedicate a portion of its output data to include signature data that may be used to identify information about the model. The model may be configured so that some portion of its least-significant output bits may represent the signature data. The signature data may be a unique code that corresponds to the particular model. The signature data may also include encoded data that may represent information such as a model version, model author, or the like. A recipient of the model output data may thus use the signature data to determine information about the particular model, even if the model itself is inaccessible.

9 Claims, 15 Drawing Sheets

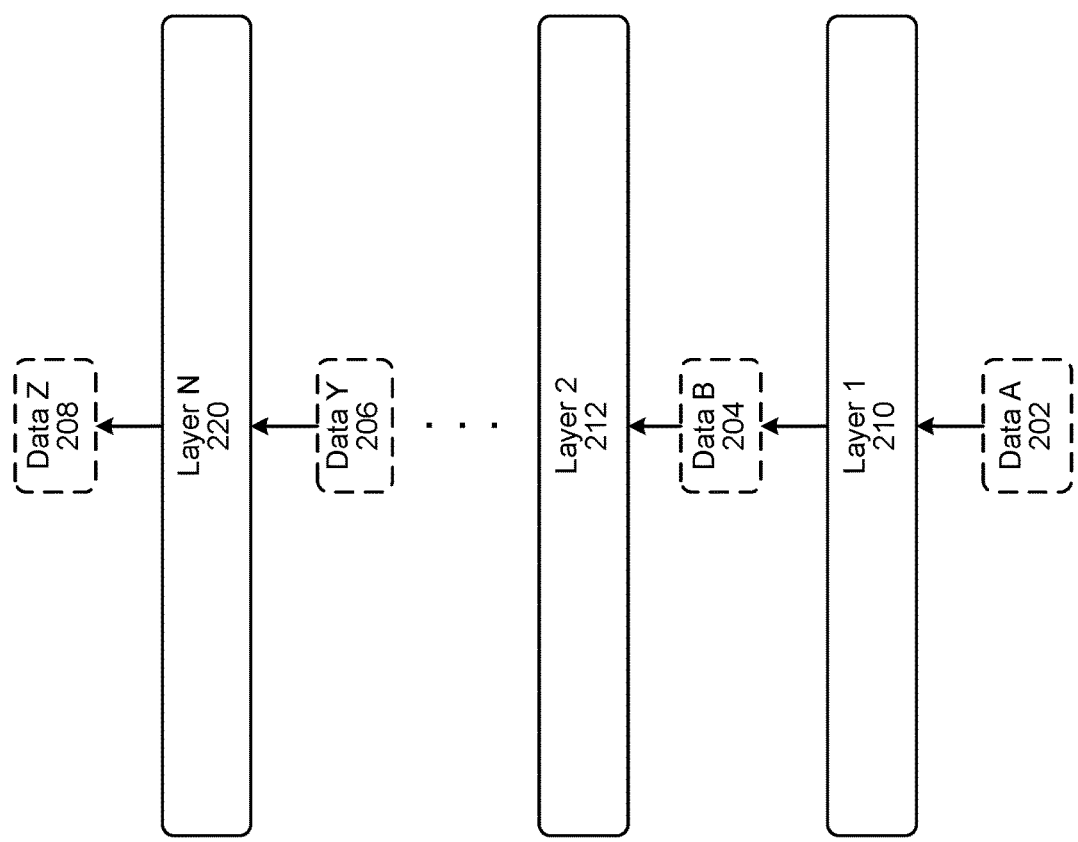

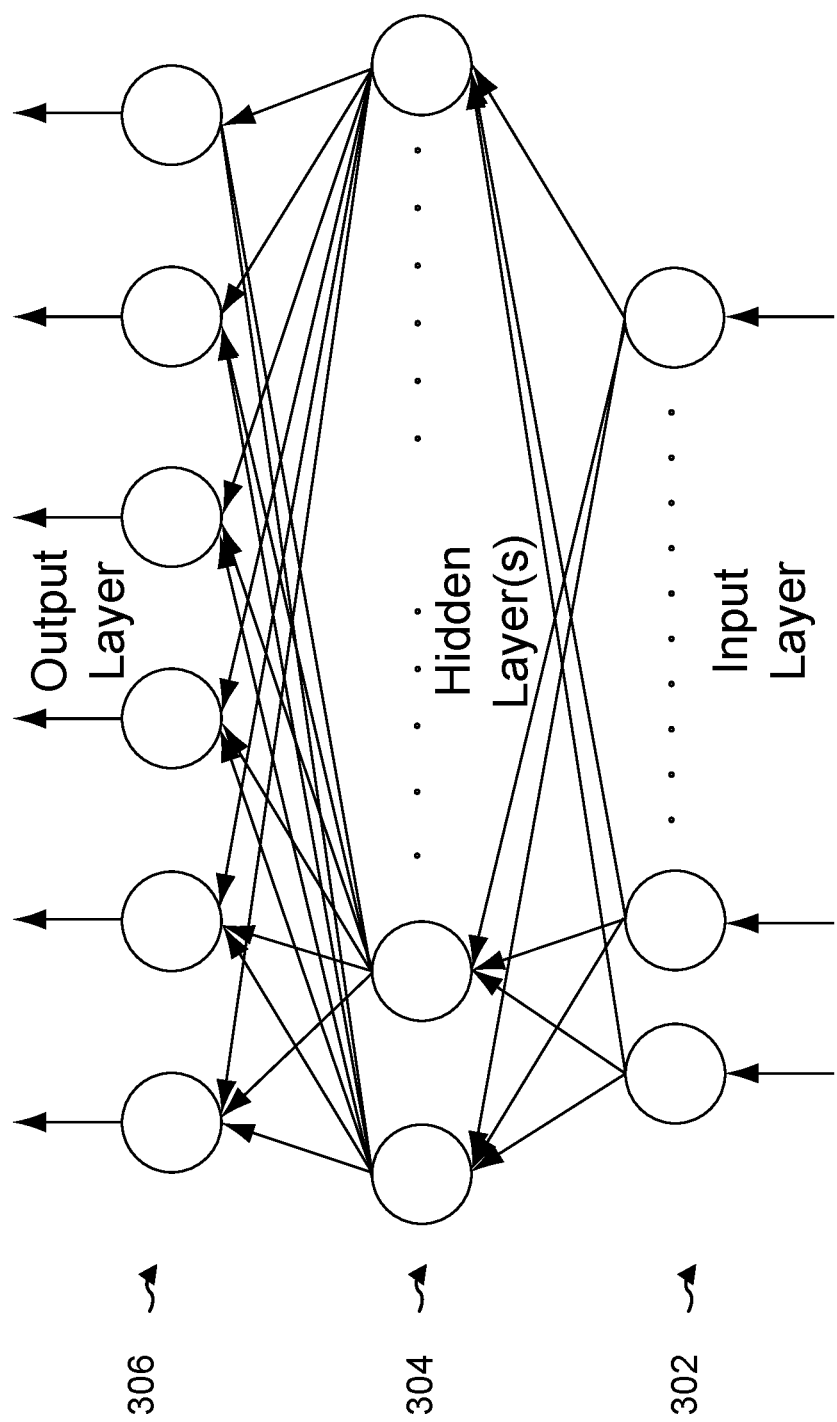

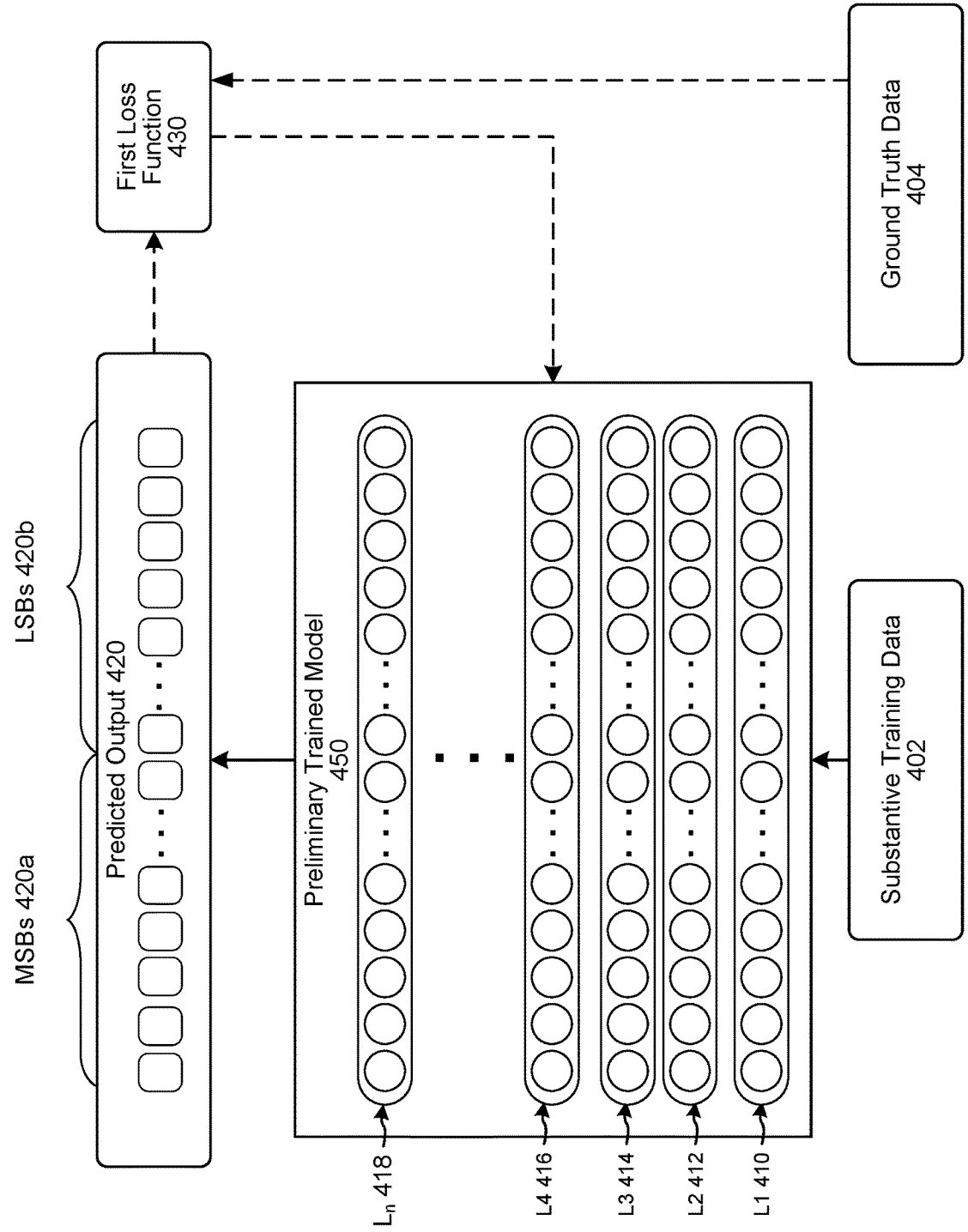

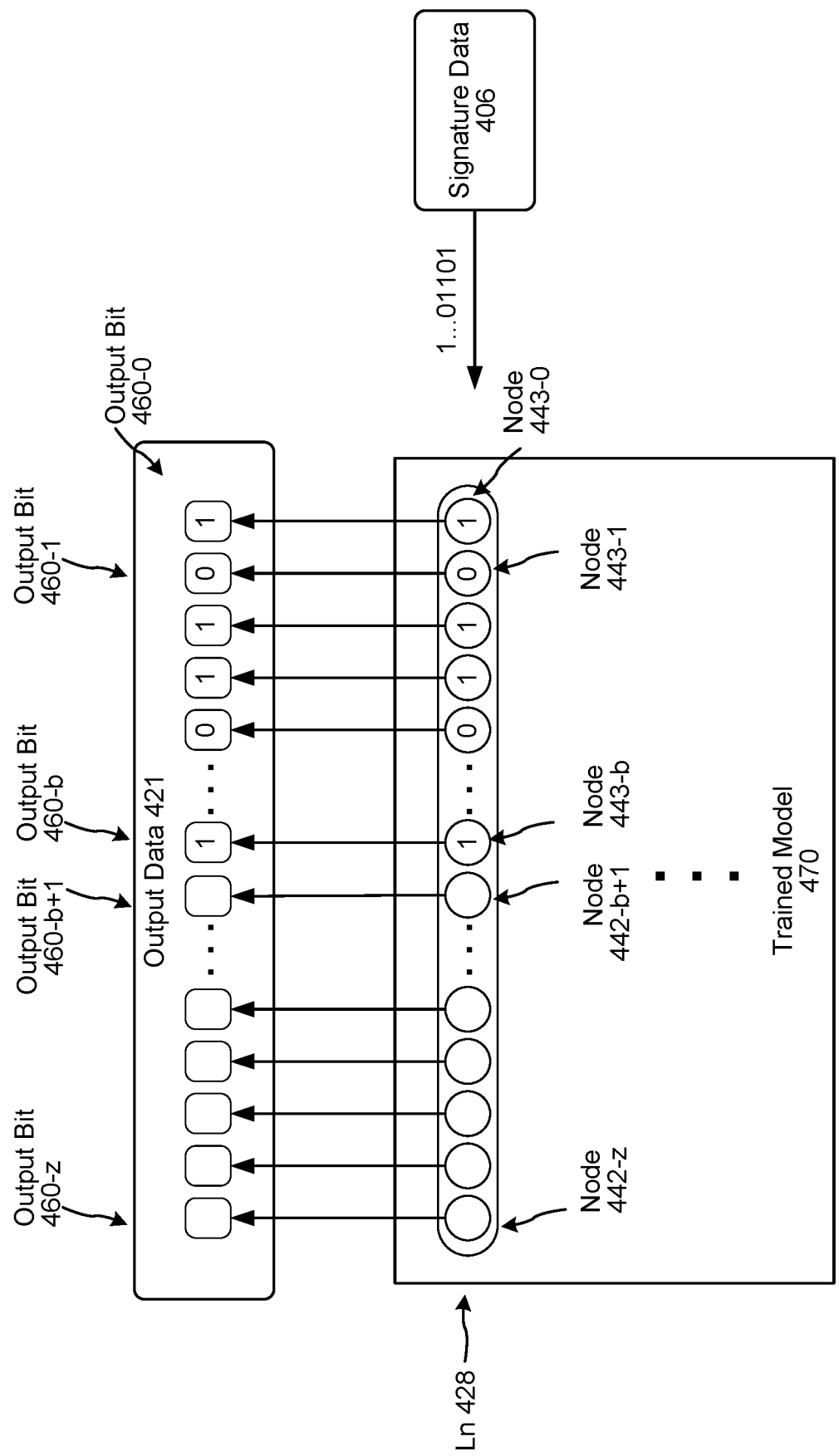

MACHINE LEARNING MODEL SIGNATURES

BACKGROUND

A computer system may use one or more machine learning models to process input data to make inferences and/or predictions. Such machine learning models may include artificial neural networks (NN) such as convolutional networks, recurrent neural networks (RNN), long short-term memory (LSTM), transformers, conformers, etc. A NN may be made up of one or more layers, with a layer including one or more nodes (also referred to as artificial neurons). A node may include a number of inputs, such as from previous layers, and outputs, such as to subsequent layers.

BRIEF DESCRIPTION OF DRAWINGS

For a more complete understanding of the present disclosure, reference is now made to the following description taken in conjunction with the accompanying drawings.

FIG. 2 is a conceptual diagram illustrating layers of a trained model according to embodiments of the present disclosure.

FIG. 3 illustrates a neural network according to embodiments of the present disclosure.

FIG. 4A illustrates training of a machine learning model using ground truth data and a loss function according to embodiments of the present disclosure.

FIG. 4C illustrates reconfiguring aspects of trained model to output a desired value in certain bit locations according to embodiments of the present disclosure.

DETAILED DESCRIPTION

Figure 1:
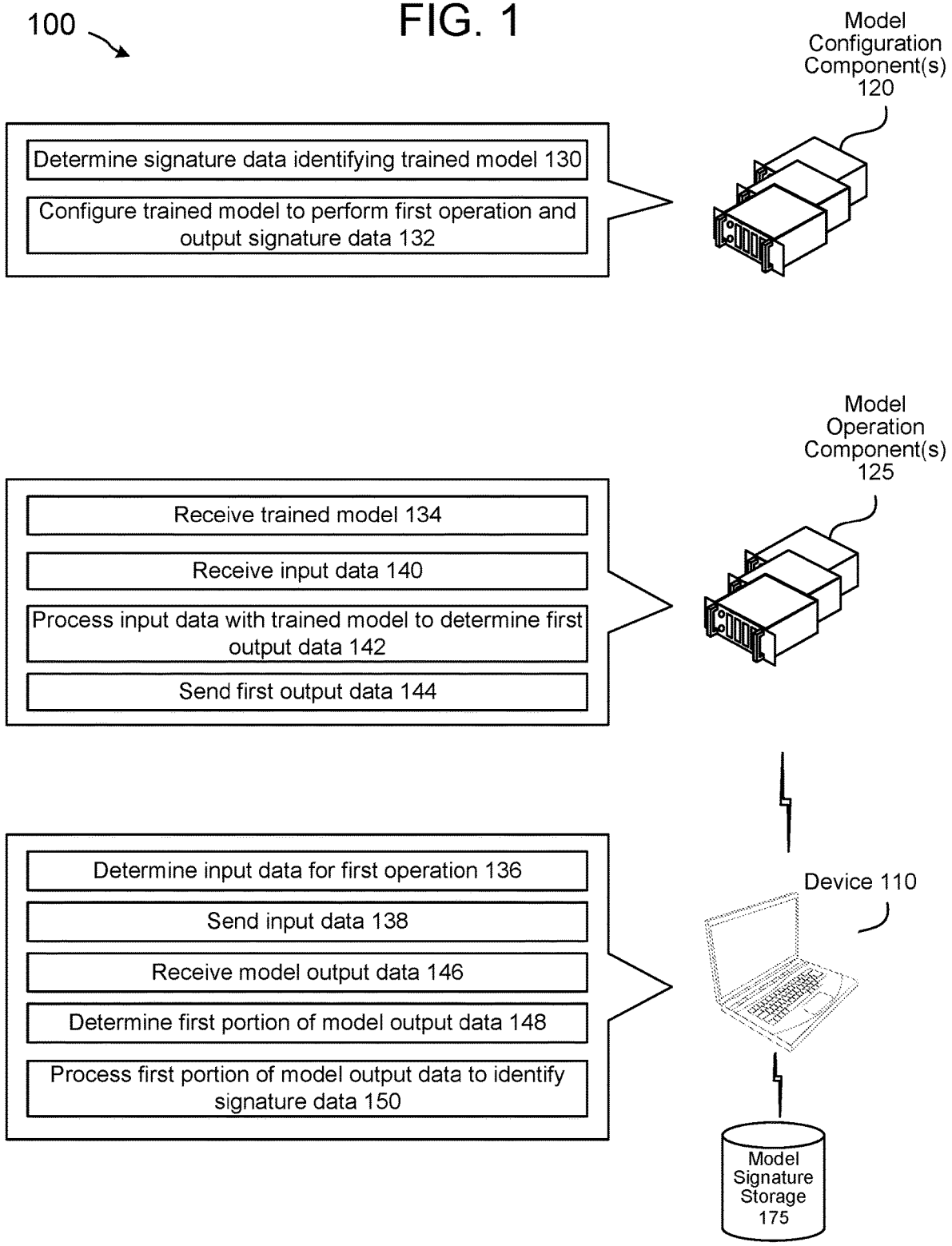
FIG. 1 is a conceptual diagram illustrating a system for encoding configuring a model to output an encoded signature, according to embodiments of the present disclosure.

Machine-learning (ML) is a technique involving training computing components to perform certain operations in a trained/learned way rather than using more rigid programming techniques.

ML components, such as trained models, may be configured/trained to perform one or more tasks by one system and then deployed to actually perform those tasks by another system. For example, one system, such as a model configuration component(s), may have access to a corpus of training data examples, each with an established ground truth, that may be used to configure a model to perform the desired task. Various techniques may be used to train a model including backpropagation, statistical learning, supervised learning, semi-supervised learning, stochastic learning, stochastic gradient descent, or other known techniques. The model configuration component(s) may use training data and one or more machine learning techniques to train a model for its desired purposes. Once the model is trained it may be sent to a device or other system, such as a model operation component(s), for operation. For example, a trained model may reside on a system that can operate an interface with user devices to perform tasks such as classification (such as image classification, audio classification, etc.), semantic segmentation, audio processing, language processing, data analysis, or the like. A user device may send input data to the model operation component(s), which may process that input data using the trained model, and then return the model's output data to the user device. When new training data is available, the model configuration component(s) may re-train or otherwise update a trained model (such as to improve its future operation) and may send the updated model to the model operation component(s).

Typically models are configured only to output data corresponding to the their respective functions (e.g., result data) thus requiring the use of metadata or other data not output by the model itself, to determine information about the model if the model is unavailable for analysis.

To improve the ability to determine a model used to perform a task, offered is a technique to configure a model to output embedded identification data as part of its functional output data. For example, a model may be configured to set aside certain bit locations of its output data to allot to a signature, or other code, that may be used to identify the model by a downstream recipient of the model's output data, even in the absence of metadata or other secondary data associated with the model. In this manner, a specific model may "sign" its output with an integrated "signature", thus allowing the source model to be identified, even if the model's output data is available but the model itself is not.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The techniques herein may be used to configure a model to embed certain identifying data within its output. The techniques herein may also be used identify a model based on its output.

To maintain integrity and ensure security and privacy of a trained model, a system may incorporate various security measures to protect access to the model. Further, the system may identify and log access of the model. This may include, for example, determining who (e.g., what user profiles) accessed the model and which devices, for example what devices associated with a model configuration component(s), were used to access and/or train the model. The information determined can then be logged by storing it in computer readable memory accessible by those with appropriate access permissions.

To identify and log data access, a system may use different devices and system components to store data indicating access to protected information, such as a model. Such data may be stored in various locations across a system. To improve upon such techniques, the system may, in addition or in the alternative, insert encoded data indicating how and/or by which device(s)/profile(s) the underlying data (such as data corresponding to a trained model) was accessed, stored, processed, etc. For example, the information indicating how an underlying model was accessed and/or related details describing the model or associated data may be referred to as data access information. Such data access information may be part of an attribute of a request for access to a model. The data access information may describe how the underlying file or data was accessed and may include, for example, a client ID (e.g., a MAC address or IP address of a client device requesting the data), a model version (e.g., a watermarking version), a key version, a source ID (e.g., of a device that initially received or determined the data), a user (e.g., a user profile ID) of the user requesting access to the model (e.g., a user operating a specific client device), a timestamp (e.g., when the data was requested or provided), and/or a data type of the data. In other words, the data access information may be stored and encoded. Later, the encoded information may be decoded to determine, for example, who accessed the data (for example, a trained model), which device was used to access the data, when the data was accessed, etc. In this manner information regarding access to the trained model may be obtained and analyzed (for example from the model's output data into which the encoded information is inserted), even if the model is separate from the original system which created the model (e.g., separated from the model configuration component(s) 120).

The techniques discussed herein may be used with a variety of models configured to operate on a variety of types of input data such as, for example, audio data, image data, statistical data, etc.

Many different encoding schemes exist, particularly for media data. For example, image data may be encoded using schemes such as JPEG (Joint Photographic Experts Group), TIFF (Tagged Image File Format), or others; audio data may be encoded using schemes such as WAV (Waveform Audio File Format), MP3 (MPEG-1 (Motion Picture Experts Group) Audio Layer III or MPEG-2 Audio Layer III)), or others; and video data may be encoded using schemes such as MPEG-4, AVI (Audio Video Interleave), or others. Such encoding schemes typically are standardized in a way that encodes the data to compress it for purposes of easier distribution. These encoding schemes do not address watermarking/encoding, in a machine-readable but not user-perceptible way, attributes of a request for data such as an identifier of a device that will access the data, or other attributes discussed herein.

FIG. 1 is a conceptual diagram illustrating a system 100 for configuring a model to include signature data in its outputs and for using such a model during runtime operations. Signature data is data that may be used to identify information about the model. For example, the signature data may include a code (such as a string of bits or other data) that may be used to reference a lookup table which identifies information about the model that corresponds with the signature data. For example, the table may indicate the model author (in terms of user, company, etc.), the model's version number, version date, originating location (e.g., server from which it was sent from a model configuration component(s)), or other information. The signature data may also include encoded data representing various pieces of information related to the model such as those discussed herein.

As shown in FIG. 1, the system 100 may include a model configuration component(s) 100, a model operation component(s), a device 110, and model signature storage 175. The system(s) 120/125 may be remote system(s) such as a group of computing components located geographically remote from the device 110. Such systems/devices may be connected across one or more networks 199 (shown in FIG. 12). Although the figures and discussion of the present disclosure illustrate certain steps in a particular order, the steps described may be performed in a different order (as well as certain steps removed or added) without departing from the present disclosure.

As shown a model configuration component(s) 120 may determine (130) signature data identifying the trained model. The signature data may include a series of bit values (for example a 16 bit code, 32 bit code, or other series of bit values) that represent the particular model. For example, the signature data may comprise a series of bit values that can be referred to in a lookup table to identify the particular model. For example, a code 0100110111001110 may refer to a particular model such as "Image classification model AB2; version 1.5." Information linking the code and information about the model may be found in a lookup table or similar data and may be stored, for example, in model signature storage 175 or in some other manner. The signature data may also include encoded data representing information such as that discussed herein (for example model version, model source, client ID, key version, source ID, etc.). The signature data may be encoded using encoding techniques that enables a decoding device (such as device 110) that has information about the corresponding decoding technique, to decode the signature data to determine information about the model, even without necessarily accessing a lookup table or similar data.

The model configuration component(s) 120 may configure (132) the trained model so that the trained model is configured to perform a first operation (for example, image classification, audio processing, other data processing, etc.) and configured to also output the signature data in addition to the substantive output related to the results of the first operation. To configure the model in this manner the model configuration component(s) 120 may perform operations such as those discussed below in reference to FIGS. 4A-7. The operation may be any one (or more) of a number of operations for which a machine learning model may be used. The techniques discussed herein for including signature data in model output data may be applied across a variety of models configured for a variety of functions.

Once the trained model is configured, at some point it may be received (134) by the model operation component(s) 125. The model operation component(s) 125 may be sent the model from the model configuration component(s) 120 or the model operation component(s) 125 may acquire the trained model in some other fashion. The model operation component(s) 125 may be associated with some interface, such as a website, upload interface, etc. that is capable of receiving data to be processed by the trained model as part of running the first operation. In one example the device 110 may send input data to the model operation component(s) (s) 125 via an application that is installed on the device 110 and associated with the system(s) 125. A user/other device may interact with that interface to perform instances of the first operation and, as a result, receive output data from the model. To check the origins of the model, that user/other device may process the model's output data to identify and match signature data included in the output data to determine some information about the model.

A device 110, which may be a user device, other server, or the like may determine (136) input data for a run of the first operation. For example, if the first operation involves image classification, the device 110 may determine image data to be used; if the first operation involves audio classification, the device 110 may determine audio data to be used, etc. The device 110 may send (138) the image data through the interface to the model operation component(s) 125. The model operation component(s) 125 receives (140) the input data and processes (142) the input data with the trained model to determine model output data. The model output data may be in a format typically associated with the first operation, with certain modifications to include the signature data as described herein. The model operation component(s) 125 then sends (144) the model output data to the device 110. As discussed herein, the model output data may include a first portion (e.g., a select number of bits) corresponding to the signature data and a second portion corresponding to a result of the first operation.

The device 110 receives (146) the first output data and processes the first output data to determine (148) a first portion corresponding to expected signature data. The device 110 may not know ahead of time if a signature is included in the model output data and so it may perform operations to isolate the portion(s) of the model output data that should corresponding to the signature data if it is included. For example, these portion(s) may correspond to a certain number of bits (for example N number of least significant bits as explained herein) of the model output data. The device 110 may then process (150) the first portion of the model output data to identify signature data. The device 110 may then identify specific model information using the signature data and may also use stored data such as model signature storage 175 to match the signature data with model information. The device 110 may do so, for example, using techniques described herein in reference to FIGS. 9 and 8. In this manner the device 110 may determine information about the model used for the first operation even though the device 110 only has access to the model output data and does not have access to the model itself.

A machine learning model may take many forms, including a neural network. For example, the trained model/machine learning component may employ artificial neural networks (NN) such as convolutional neural networks (CNNs), recurrent neural networks (RNN), long short-term memory (LSTM), transformers, conformers, fully-connected neural networks, classifiers, etc.

As illustrated in FIG. 2, a neural network may include a number of layers, from input layer 1 210 through output layer N 220. Each layer includes one or more nodes and is configured to input a particular type of data and output another type of data. A layer may be represented by a data structure that represents the connections between layers and operations within a layer. The neural network illustrated in FIG. 2 is configured to input data of type data A 202 (which is the input to layer 1 210) and output data of type data Z 208 (which is the output from the last layer N 220). The output from one layer is then taken as the input to the next layer. For example, the output data (data B 204) from layer 1 210 is the input data for layer 2 212 and so forth such that the input to layer N 220 is data Y 206 output from the penultimate layer (not shown).

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

An example neural network for the trained model is illustrated in FIG. 3. A neural network may be structured with an input layer 302, one or more middle layer(s) 304, and an output layer 306. The middle layer(s) may also be known as the hidden layer(s). Each node of the hidden layer is connected to each node in the input layer and each node in the output layer. Although illustrated in FIG. 3 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Depending on model configuration, the output data 420 of a model operation may correspond to a particular score or confidence value. Thus, output data 420 of a model with a value of 987234 (expressed as a decimal rather than binary value) may indicate a high confidence that the operation of the model returned a positive response. For example, if a machine learning model is configured to determine whether a cat is present in a particular image, if the model operates on input image data and produces output data having a value of 0.987234, the model estimated that a cat was present in the image data. As can be appreciated however, it may not be necessary for the model to output the final few digits of that output data in order to produce a positive response. Output data of 0.98 or even 0.9 would be sufficient to satisfy the function of the model while the least significant portion of the output data (in the above example, the 0.x87234 or 0.xx7234) may not impact any substantive operations. Thus, those least significant portions may be used for other purposes without meaningfully impacting the model performance. Specifically, a model may be configured to output signature data using least-significant bits (or bits that are not most-significant bits) without meaningfully impacting the model performance. Thus, in one configuration the bits corresponding to the function (e.g., the substantive portion) may comprise more significant bits than those corresponding to the signature data.

Configuring a model to output desired signature data may be performed in a number of ways. One way is described below in reference to FIGS. 4A-5. As shown in FIG. 4A, a model configuration component(s) 120 may train a preliminary trained model 450 to perform one or more functions using one or more machine learning techniques. For example, the model configuration component(s) 120 may use substantive training data 402 (which may include example input data for certain training examples) and corresponding ground truth data 404 (which may include the desired output data for the particular input training example), along with a first loss function 430 which is configured to adjust the layers/weights/model data within the model during training to configure the model properly to perform the intended function.

As shown, the ultimate preliminary trained model 450 may include a plurality of layers from an original input layer L1 410, through certain hidden layers (include L2 412, L3 414, L4 416, and/or other layers) up until the final/output layer Ln 418. After performing an operation of the model's function, the preliminary trained model 450 may pass the values from the final/output layer $L_n$ 418 as a predicted output 420. As can be appreciated, the output data 420 from the preliminary trained model 450 may include a variable number of bits worth of data, depending on the model configuration.

As shown, the model output data may be considered as two different portions, one portion 420*a* corresponding to the most-significant bits of the output data 420 and another portion 420*b* corresponding to the least-significant bits of the output data 420. How large these portions are may be configurable and the portions may not be equally sized. Further, another section of bits may exist between the two portions, where bits in this other section may not be considered most-significant or least-significant. For example, for a 16-bit output, the first 8 bits may be considered the most-significant bits (MSBs) 420*a* and the last 4 bits considered the least-significant bits (LSBs) 420*b* with 4 bits in a middle section. In another example, for a 128 bit output, the first 100 bits may be considered the most-significant bits 420*a* and the last 28 bits considered the least-significant bits 420*b*. In another example, for a 128 bit output, the first 28 bits may be considered the most-significant bits 420*a* and the last 100 bits considered the least-significant bits 420*b*. As can be appreciated, there are many different potential configurations of these bit portions. Configuration of which bits fall into which portion may depend on the function of the model, the potential impact to performance of certain bits with signature data, etc.

Figure 4B:
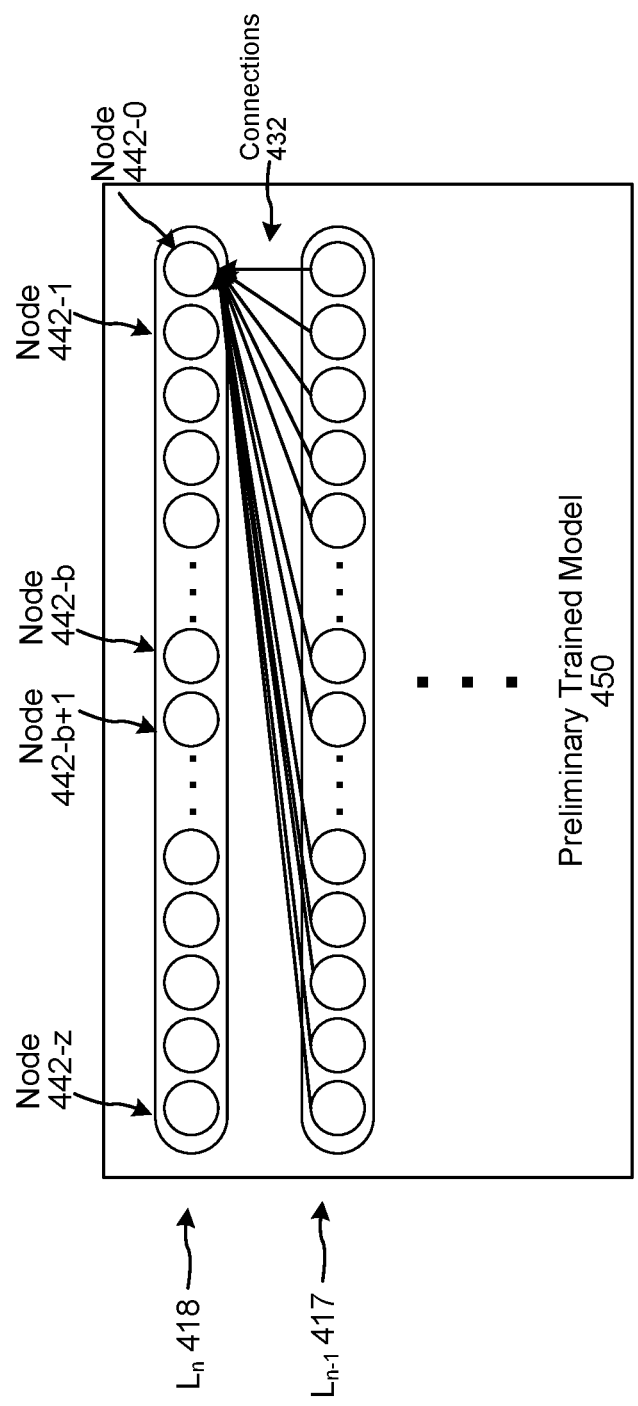
FIG. 4B illustrates example connections between layers of a trained model according to embodiments of the present disclosure.

As discussed above, in a neural network nodes from one layer may have connections with nodes of another layer such that data values may be passed from one layer to another. For example, as shown in FIG. 4B, the nodes of output layer $L_n$ 418 may have a variety of connections with the nodes of penultimate layer $L_{n-1}$ 417 (e.g., the layer just before output layer Ln 418). As shown, output layer $L_n$ 418 has a certain number of nodes corresponding to a portion of the layer's least-significant bits (e.g., nodes 442-0 through node 442-*b*). The output layer $L_n$ 418 also has a certain number of nodes corresponding to a portion of the layer's most-significant bits (e.g., nodes 442-*b*+1 through node 442-*z*). Each of the nodes of output layer $L_n$ 418 may have a connection with each of the nodes of penultimate layer $L_{n-1}$ 417. Each of those respective connection may be associated with a weight, which corresponds to how much the prior layer's node's data impacts the node of the following layer. For example, as shown in FIG. 4B, the least-significant node of output layer $L_n$ 418 is node 442-0. That node is connected to each of the nodes of the penultimate layer $L_{n-1}$ 417 through connections 432, where each connection is associated with its own weight. If every respective weight value for each of the connections 432 were set to zero, it would mean that the operations/data from penultimate layer $L_{n-1}$ 417 would have no impact on the operation of node 442-0 and that the least-significant bit of predicted output 420 would always be whatever prior value was set for node 442-0. In this way that bit could be fixed to a certain value that would not change, regardless of the value of the input data and/or the operations of/values passed forward by penultimate layer $L_{n-1}$ 417.

The model configuration component(s) 120 may thus use such an approach to fix the value of the least-significant bits of model output data to match desired signature data. Such an operation is shown in FIG. 4C. The preliminary trained model 440 may be altered such that the connection weights from the penultimate layer $L_{n-1}$ 417 to the least-significant nodes (e.g., nodes 442-0 through node 442-*b*) of the output layer $L_n$ 418 may be set to zero. This may thus result in a modified output layer $L_n$ 428 for the resulting modified preliminary trained model 440, referred to as the trained model 470. Thus, for trained model 470 nodes 443-0 through 443-*b* of output layer $L_n$ 428 would be effectively disconnected from the previous layer(s) of the trained model 470.

The least-significant nodes (e.g., nodes 442-0 through node 442-*b*) of the output layer $L_n$ 418 may then be set to output the values of a bit sequence corresponding to signature data 406, for example 1 . . . 01101 as shown in FIG. 4C, but that sequence/value is configurable as can be appreciated. Thus, the trained model 470 may create output data 421 whose least-significant output bits (e.g., bits 460-0 through 460-*b*) match the values of nodes 442-0 through node 442-*b*, namely the signature data 406. The other bits of the output data, namely the most significant bits 460-*b*+1 through 460-*z* would match the values output by nodes 442-*b*+1 through 442-*z* of output layer $L_n$ 428 of trained model 470. The values passed by those nodes would correspond to the particular model operation as nodes 442-*b*+1 through 442-*z* remain connected (though their respective model weights) to the previous layer(s) of the trained model 470. Thus, nodes 442-*b*+1 through 442-*z* may pass output data that is substantive output data related to the function being performed by the model.

Figure 5:
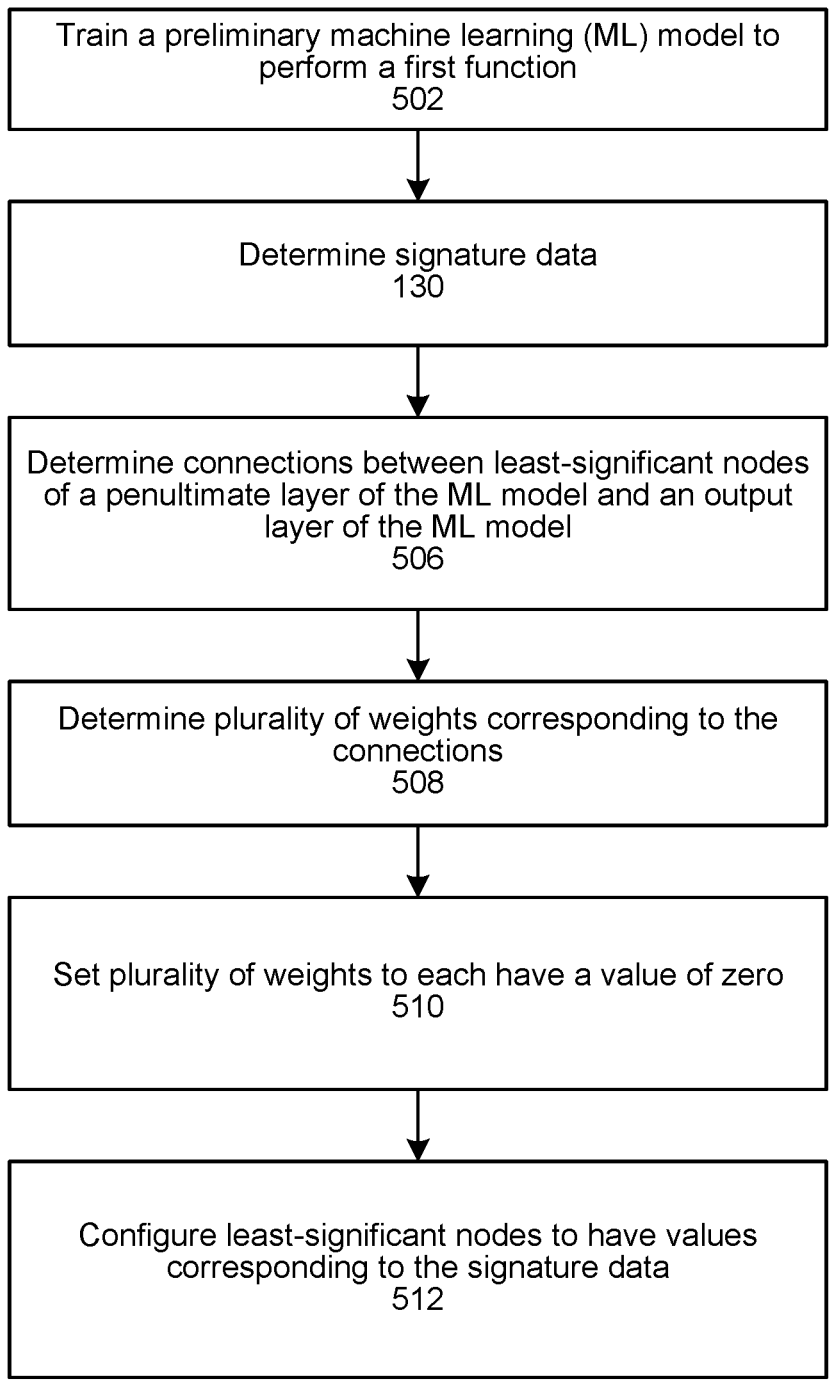
FIG. 5 is a flow diagram describing configuring a model to output a desired value in certain bit locations according to embodiments of the present disclosure.

FIG. 5 illustrates a method 500 that may be performed, for example by model configuration component(s) 120 to determine a trained model 470 configured to output signature data along with substantive output data. As shown, the system 120 may train (502) a preliminary machine learning model to perform a first function. The system 120 may determine (130) signature data representing some information about the model. The system 120 may determine (506) connections between least-significant nodes of a penultimate layer of the model and an output layer of the model. The system 120 may determine (508) a plurality of weights corresponding to the connections and may set (510) the value of each of those weights to zero. The system 120 may configure (512) the least-significant nodes to have values corresponding to the signature data.

In this manner the trained model 470 remains configured to perform the operation as trained for the preliminary trained model 440, but during runtime only the most-significant bits (e.g., bits 460-*b*+1 through 460-*z*) of the output data 421 of the trained model 470 will represent values determined by performance of the operation (e.g., substantive output data) while the least-significant bits (e.g., bits 460-0 through 460-*b*) of the output data 421 would comprise the signature data 406. The trained model 470 may thus be configured (132) as referred to in FIG. 1 and operated as explained above. The output data 421 from the model could then be used as explained herein to isolate the signature data and eventually determine information about the model.

The process of fixing bit values for the model may be done for a group of least-significant bits and/or other bits depending on model configuration.

Another way to configure a model to output desired signature data is described below in reference to FIGS. 6A-7. In this approach, different loss functions are used to train different model portions. One loss function is used to train the portion of the model related to substantive portions of the model (e.g., the portions that will be used to output data related to the function of the model) and another loss function is used to train the portion of the model related to outputting the signature data 406. In this manner, a model may be trained so that a substantive output portion corresponding to the function of the model may be configured to perform the function in response to an input while a signature data portion may be configured to output the signature data in response to the same input.

Figure 6A:
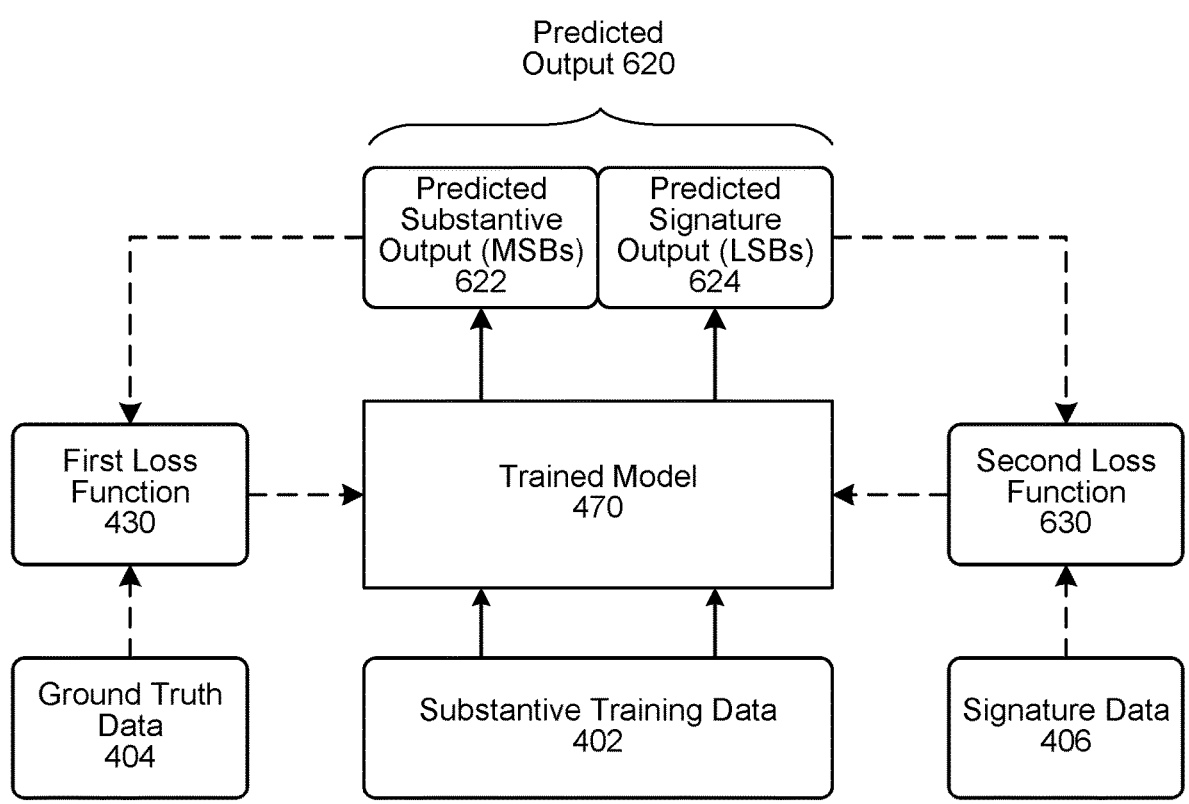
FIGS. 6A-6B illustrates components to use different loss functions to train a model to output a desired value in certain bit locations according to embodiments of the present disclosure.

As shown in FIG. 6A, during training a model 470 is input examples of substantive training data 402 and predicts a substantive output portion 622 related to the performance of the function that is being trained with regard to that particular training example. The predicted substantive output portion 622 may correspond to the most-significant bits (MSBs) of the predicted output 420, though in certain configurations it may correspond to other portions of the predicted output 420. The predicted substantive output portion 622 is compared to the ground truth data 404 for the particular training example and a first loss function 430 is applied to the model to adjust the weights of the model 470 to more accurately perform the function with regard to the substantive portion 622 of the predicted output 620. This process continues until the substantive portion 622 of the predicted output 620 sufficiently satisfies the first loss function 430, thus indicating the trained model 470 is sufficiently trained to perform the desired function (and output corresponding results as part of the substantive output portion of output data) of the model.

Similarly during training the model 470, in response to the input examples of substantive training data 402, predicts a signature output portion 624 in attempts to output the signature data 406. The predicted signature data output portion 624 may correspond to the least-significant bits (LSBs) of the predicted output 420, though in certain configurations it may correspond to other portions of the predicted output 420. During training, the predicted signature data output portion 624 is compared to the signature data 406 regardless of the particular example of substantive training data 402. A second loss function 630 is applied to adjust the weights of the model 470 to more accurately output the signature data 406 as the predicted signature data output portion 624, regardless of the input data to the model. This process continues until the signature output portion 624 of the predicted output 620 sufficiently satisfies the second loss function 630, thus indicating the trained model 470 is sufficiently trained to output the signature data 406 (as part of the predicted signature portion of the output) in response to a model input.

Figure 6B:
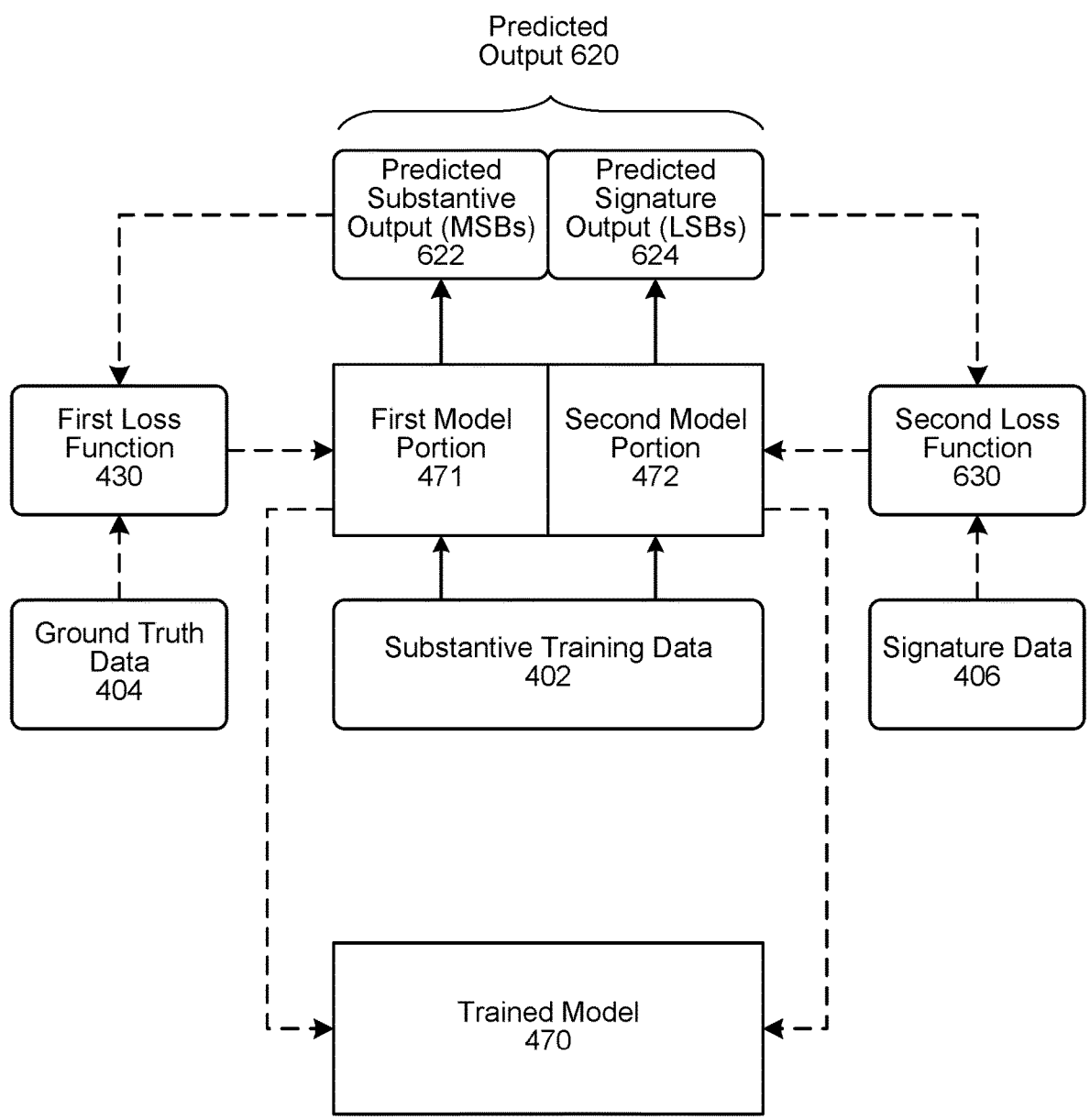

As shown in FIG. 6B, during training a first model portion 471 is input examples of substantive training data 402 and predicts a substantive output portion 622 related to the performance of the function that is being trained with regard to that particular training example. The predicted substantive output portion 622 may correspond to the most-significant bits (MSBs) of the predicted output 420, though in certain configurations it may correspond to other portions of the predicted output 420. The predicted substantive output portion 622 is compared to the ground truth data 404 for the particular training example and a first loss function 430 is applied to the first model portion 471 to adjust the weights of the first model portion 471 to more accurately perform the function. This process continues until the first model portion 471 is sufficiently trained to perform the desired function of the model.

A second model portion 472 is also input examples of substantive training data 402 and predicts a signature data output portion 624. The predicted signature data output portion 624 may correspond to the least-significant bits (LSBs) of the predicted output 420, though in certain configurations it may correspond to other portions of the predicted output 420. For the second model portion 472, the predicted signature data output portion 624 is compared to the signature data 406 regardless of the particular example of substantive training data 402. A second loss function 630 is applied to the second model portion 472 to adjust the weights of the second model portion 472 to more accurately output the signature data 406 as the predicted signature data output portion 624, regardless of the input data to the model. This process continues until the second model portion 472 is sufficiently trained so that it is likely to output the signature data 406 in response to a model input.

Once trained, the first model portion 471 and second model portion 472 the trained model is then generated using the first model portion 471 and the second model portion 472. In one example, the first model portion 471 and second model portion 472 are combined to result in the trained model 470. For example, the first model portion 471 may be appended to the second model portion 472 to form the trained model 470, where one portion of the trained model 470 includes the first model portion 471 and another portion of the trained model 470 includes the second model portion 472, thus effectively creating a single model from two different model portions, where one portion may not impact the operation of another portion. In another example, the trained model 470 may be generated by connecting nodes of the first model portion 471 to nodes of the second model portion 472 such that the model portions may operate a single trained model 470 at runtime, though with the outputs corresponding to the different model portions corresponding to their respective trained output functions. A combination of the first model portion 471 and the second model portion 472 may result in a trained model 470 where the first model portion 471 ends in a certain portion of the output layer of the trained model 470 (for example, the nodes corresponding to the most-significant bits) and the second model portion 472 ends in a different portion of the output layer of trained model 470 (for example, the nodes corresponding to the least-significant bits). The trained model 470 is thus configured so that at runtime, in response to input data the trained first model portion 471 will output substantive data related to the function that the model was trained to perform while the second model portion 472 will output the signature data 406.

Figure 7:
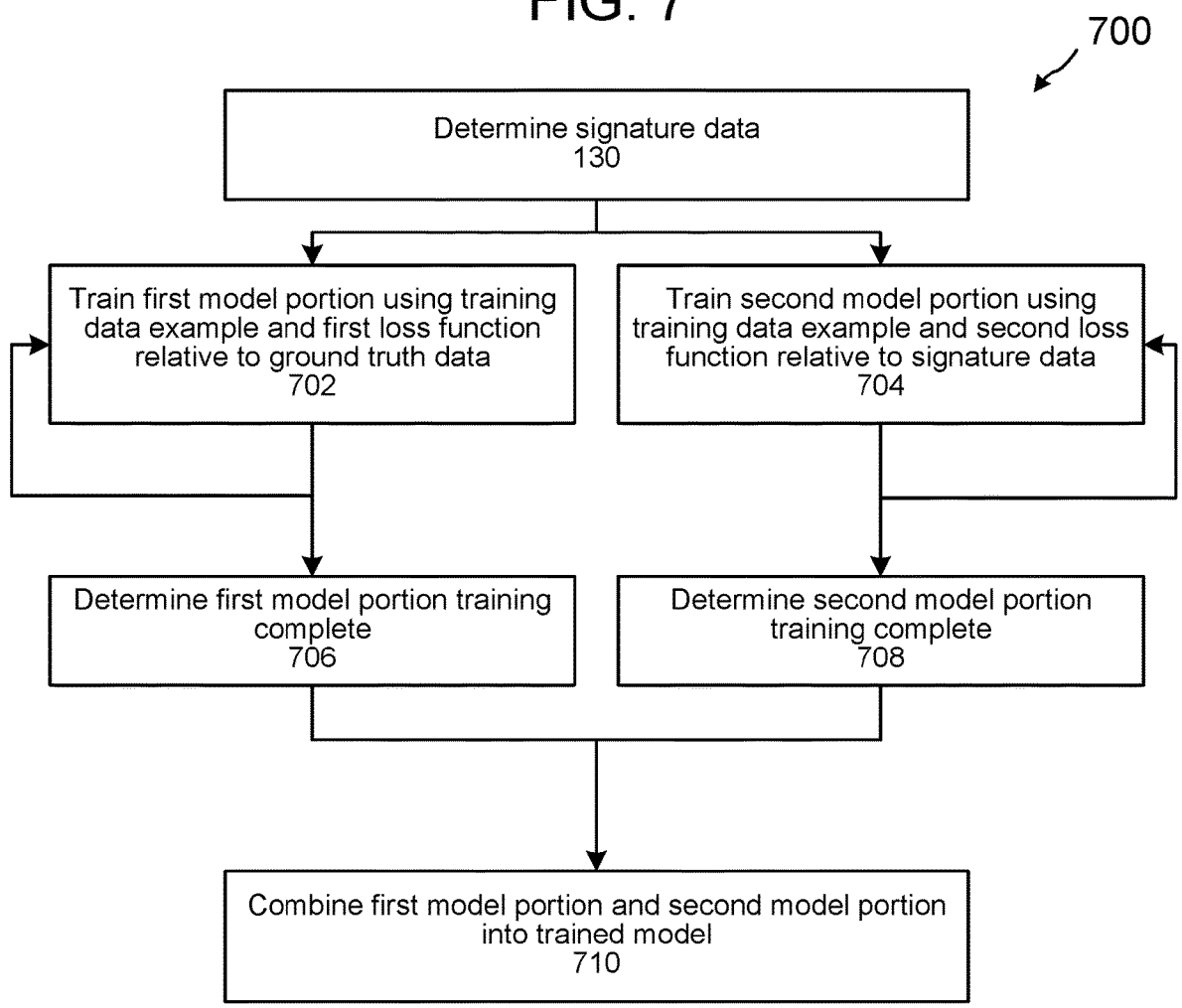
FIG. 7 is a flow diagram describing using different loss functions to train a model to output a desired value in certain bit locations according to embodiments of the present disclosure.

FIG. 7 illustrates a method 700 that may be performed, for example by model configuration component(s) 120 to determine a trained model 470 configured to output signature data along with substantive output data as illustrated above with regard to FIG. 6B. As shown, the system 120 may determine (130) signature data representing some information about the model. The system 120 may then train (702) a first model portion 471 using a training data example 402 and a first loss function 430 relative to the ground truth data 404 for the particular training data example. The system 120 may also train (704) a second model portion 472 using the training data example 402 and a second loss function 630 relative to the signature data 406. The training processes (702 and 706) may continue using different training examples and corresponding different ground truth data for training the first model portion 471 but using the different training examples and the same signature data 406 for training the second model portion 472. The system 120 may determine (706) that training for the first model portion 471 is complete. The system 120 may also determine (708) that training for the second model portion 472 is complete. Note that the number of training iterations for the first model portion and second model portion may be the same or may be different. The system 120 may then combine (710) the first model portion 471 and the second model portion 472 into the trained model 470.

A particular trained model 470 may be configured to output data with the signature data 406 in one or more particular locations. For example, if a trained model 470 is a classifier configured to output data for multiple different categories, it may embed the signature data in the output data for each category. For example, a trained model 470 to perform the function of classification as to whether an image includes a picture of a cat, dog, horse, or bird may output data in the form of:

[Cat: ccccccccccccccccssssssssssssssss]
[Dog: ddddddddddddddddssssssssssssssss] [
Horse: hhhhhhhhhhhhhhhhssssssssssssssss]
[Bird: bbbbbbbbbbbbbbbbssssssssssssssss]

where each "c" represents a bit corresponding to a likelihood a cat was detected in the image, each "d" represents a bit corresponding to a likelihood a dog was detected in the image, each "h" represents a bit corresponding to a likelihood a horse was detected in the image, and each "b" represents a bit corresponding to a likelihood a bird was detected in the image. Each "s" represents a bit corresponding to the signature data 406. As can be appreciated, in this example, each classification output includes 16 bits dedicated to the particular classification function (e.g., substantive output data) and each classification output includes 16 bits dedicated to the signature data 406. In certain configurations each output category may include the same signature bits (e.g., the output data for cat, dog, horse and bird each output the same 16 bits of signature data 406). In other configurations, different output categories may include different signature bits. Thus, taking the above example, each classification category would have 16 bits dedicated to the particular classification function (e.g., substantive output data) but in total the model output would have 64 bits dedicated to the signature data 406 (e.g., 16 bits in each of four classes of data). In this manner the model may be able to include a larger amount of signature data 406 with each set of model output. If further bits are desired for the substantive model function, the output data may be configured with fewer signature data bits, for example:

[Cat: ccccccccccccccccccccccccssssssss]
[Dog: ddddddddddddddddddddddddssssssss]
[Horse: hhhhhhhhhhhhhhhhhhhhhhhhssssssss]
[Bird: bbbbbbbbbbbbbbbbbbbbbbbbssssssss]

In this example, each classification output includes 24 bits dedicated to the particular classification function (e.g., substantive output data) and each classification output includes 8 bits dedicated to the signature data 406, thus totaling 24 total bits dedicated to the signature data 406 in the overall model output.

In another example, if a trained model 470 is a classifier configured to output data for multiple different categories, it may embed the signature data in the output data in only one of (or certain) output categories. For example, a trained model 470 to perform classification as to whether an image includes a picture of a cat, dog, horse, or bird may output data in the form of:

[Cat: cccccccccccccccccccccccccccccccc]
[Dog: dddddddddddddddddddddddddddddddd]
[Horse: hhhhhhhhhhhhhhhhhhhhhhhhhhhhhhhh]
[Bird: bbbbbbbbbbbbbbbbssssssssssssssss]

As can be appreciated, in this example, the cat, dog, and horse output data each have include 32 bits dedicated to the particular classification function (e.g., substantive output data) while the bird output data includes 16 bits dedicated to the classification function of identifying the bird (e.g., substantive output data) and 16 bits dedicated to the signature data 406.

Many other such arrangements of substantive output data and signature data may be configured depending on desired system/model operation.

As noted, once the trained model 470 is completed and operating for runtime evaluations (e.g., ready to take input data and perform the desired function), a recipient of the model's output data may evaluate the model's output data to identify the signature data and then use the signature data 406 to determine information about the model. For certain model output data, identifying the signature data may involve isolating the bits where the signature data is located. For example, if a model is configured to output data of 64 bits and the signature data is expected in 16 of those bits, a device such as device 110 may process the 64 bits of output data to determine the 16 bits of the signature data 406. The device 110 may then use a lookup table, model signature storage 175, or other data source to match the determined signature data 406 to information about the model such as a model name, number, version, or the like, that is associated with the signature data 406.

In certain configurations, a device 110 attempting to identify a model from model output data may perform additional operations beyond simply identifying the bits/data in the appropriate locations of the model output data. In certain configurations, such as when the trained model 470 is configured to output signature data using machine learning training techniques (such as those discussed with regard to FIGS. 6 and 7) as opposed to the trained model 470 being configured to output signature data in a "hard wired" fashion ((such as discussed with regard to FIGS. 4C and 5), there may be some uncertainty as to whether the expected bit locations carry the exact signature data 406 associated with a particular model or whether there may be some variation in those expected bit locations. This is the case because even precise machine learning training techniques may not be able to guarantee the same model output each time. Thus, in the situation where a trained model 470 is configured using techniques such as those discussed with regard to FIGS. 6 and 7, there may be some uncertainty as to whether the bit locations where the signature data 406 is expected (e.g., a group of least-significant output bits) will contain the exact signature data 406.

Figure 8:
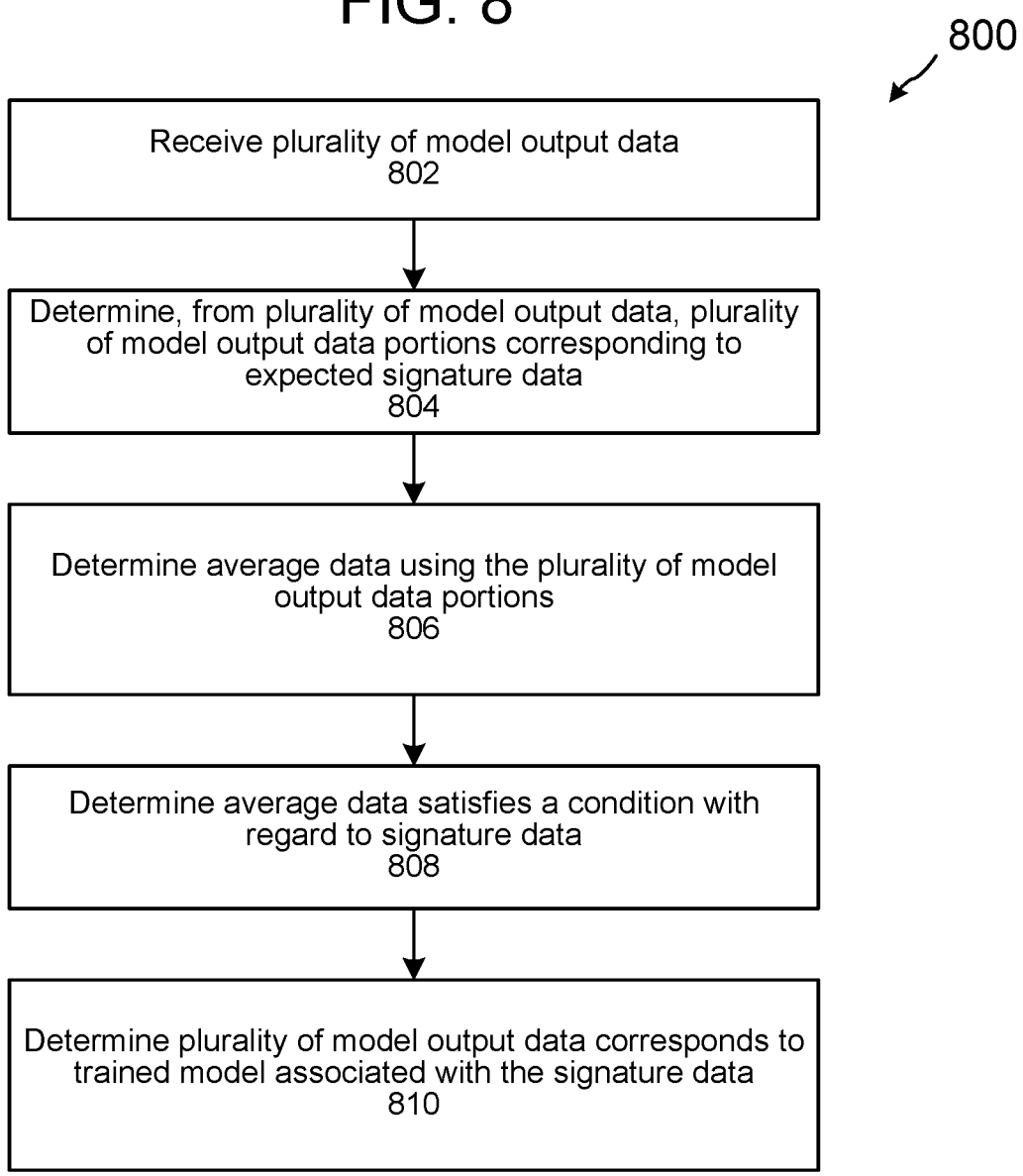
FIG. 8 is a flow diagram describing processing model output data with respect to signature data according to embodiments of the present disclosure.
Figure 9:
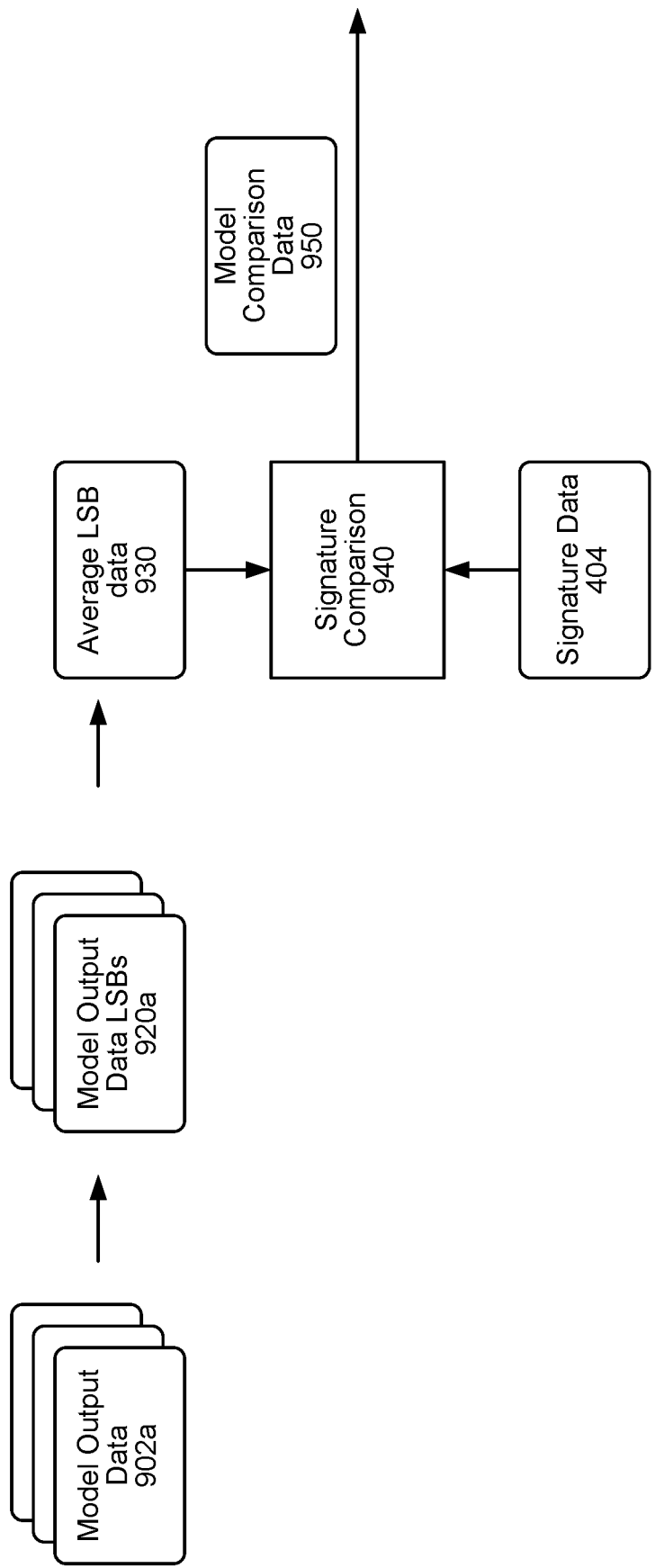
FIG. 9 illustrates processing model output data with respect to signature data according to embodiments of the present disclosure.

To account for such uncertainty, and to be able to still associated certain model output data with a certain model represented by signature data 406, a device 110 may perform certain evaluation operations. Such operations are represented in FIG. 8 by method 800 and also illustrated in FIG. 9. The device 110 may cause model operations to run multiple times using input data (either the same input data or different input data) and may gather the many instances of model output data that result from such model operations. Thus the device 110 may receive (802) a plurality of instances of model output data 902a-902n. The device 110 may then determine (804), from the plurality of instances of model output data, a plurality of model output data portions corresponding to the locations of where signature data is expected. For example, the device 110 may isolate the least-significant bits (or other data portions) where signature data is expected to be. Such plurality of model output data portions is illustrated in FIG. 9 as 920a-920n, which is model output data LSBs, in the example of the signature data being expected in the least-significant bits of the model output data. The device 110 may then average (806) the model output data portions 920a-920n by summing them and then dividing by the number of portions that were summed. The result may be average data, shown in FIG. 9 as average LSB data 930. A signature comparison component 940 of the device 110 may then determine (808) whether the resulting average data 930 satisfies a condition with regard to certain signature data 406. For example, the device 110 may be aware of certain instance(s) of expected values of signature data. For one of those values of signature data 404, if it is within a certain threshold of the value of the calculated average data 930, the device may determine (810) that the plurality of model output data (e.g., 902a-902n) corresponds to (e.g., was output by) the trained model associated with that particular value of signature data 406. The device 110 may output model comparison data 950 which may indicate whether the plurality of model output data (e.g., 902a-902n) corresponds to a particular model/signature data, and if so, which. In this manner the device 110 may still identify the source model that created certain batches of model output data, even if the specific instances of the output model data may not include the exact signature data. The average data 930 may also include other statistical data such as mode data, statistical distribution data (representing statistical distribution information for output data 902a-902n and/or 920a-920n). The signature comparison component 940 may also include a machine learning component that is trained to process output data 902a-902n and/or 920a-920n to determine if such output data matches a particular machine learning model 470.

The device 110 may also perform other operations on received model output data to isolate potentially expected signature data. For example, error encoding/decoding techniques may be used to correct/alter bits in which signature data is expected. The device 110 may perform such operations and then compare the results to potential signature data 404.

Figure 10:
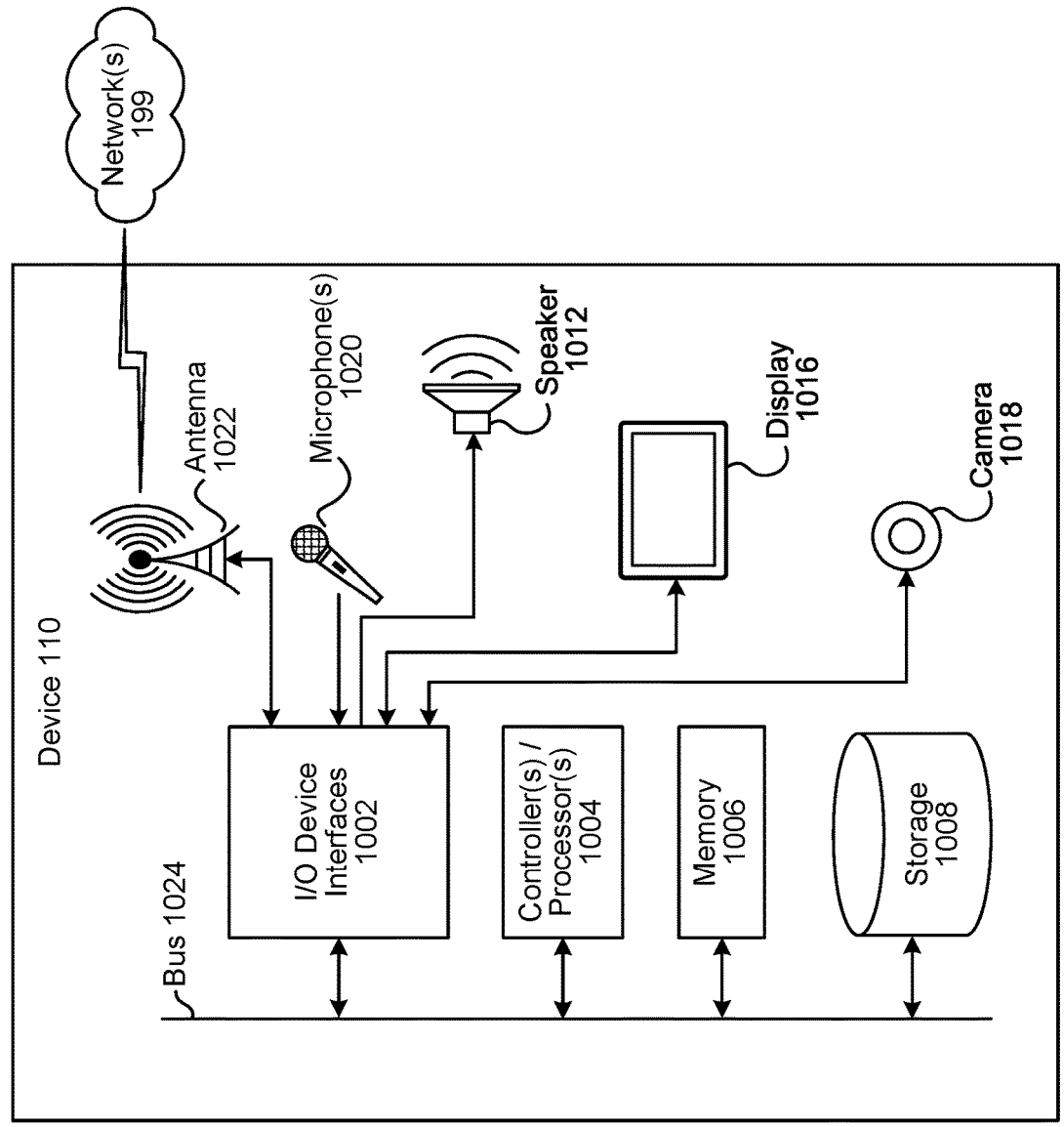
FIG. 10 is a block diagram conceptually illustrating example components of a device, according to embodiments of the present disclosure.
Figure 11:
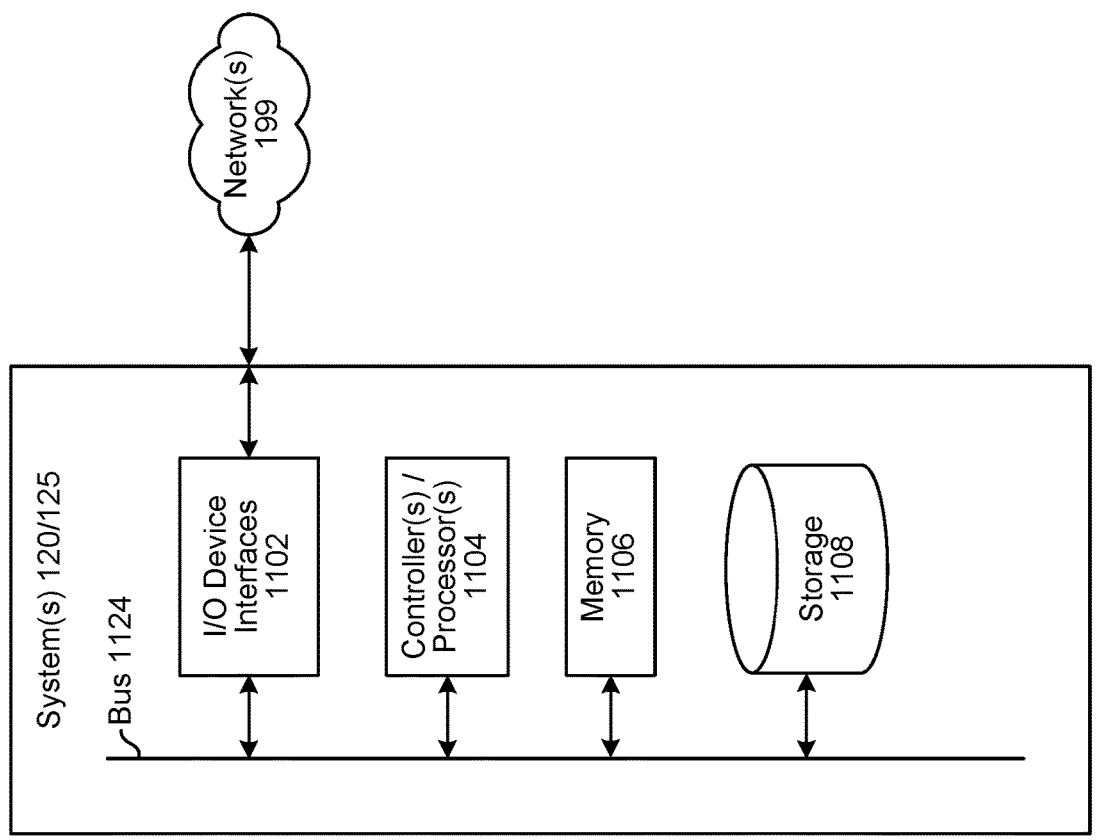
FIG. 11 is a block diagram conceptually illustrating example components of a system, according to embodiments of the present disclosure.

FIG. 10 is a block diagram conceptually illustrating a device 110 that may be used with the system. FIG. 11 is a block diagram conceptually illustrating example components of a remote device, such as the model configuration component(s) (s) 120 and/or model operation component(s) (s) 125. A system (120/125) may include one or more servers. The device 110, in certain embodiments, may also include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more systems 120 for training a machine learning model, and one or more systems 125 for operating such a model to perform various tasks. Such tasks may depend on the configuration of the trained machine learning component(s)/model(s) and may include, for example, image processing (such as computer vision, object identification, object recognition, etc.), audio processing (such as speech processing, sentiment detection, voice identification, etc.), data analysis, or a variety of other tasks. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the model configuration component(s) (s) 120, or model operation component(s) 125 may include their own dedicated processors, memory, and/or storage. Alternatively, one or more of the components of the device(s) 110, model configuration component(s) (s) 120, or a model operation component(s) 125 may utilize the I/O interfaces (1002/1102), processor(s) (1004/1104), memory (1006/1106), and/or storage (1008/1108) of the device(s) 110, model configuration component(s) 120, or the model operation component(s) 125, respectively.

As noted above, multiple devices may be employed in a single system. In such a multi-device system, each of the devices may include different components for performing different aspects of the system's processing. The multiple devices may include overlapping components. The components of the device 110, the model configuration component(s) 120, and a model operation component(s) 125, as described herein, are illustrative, and may be located as a stand-alone device or may be included, in whole or in part, as a component of a larger device or system.

Figure 12:
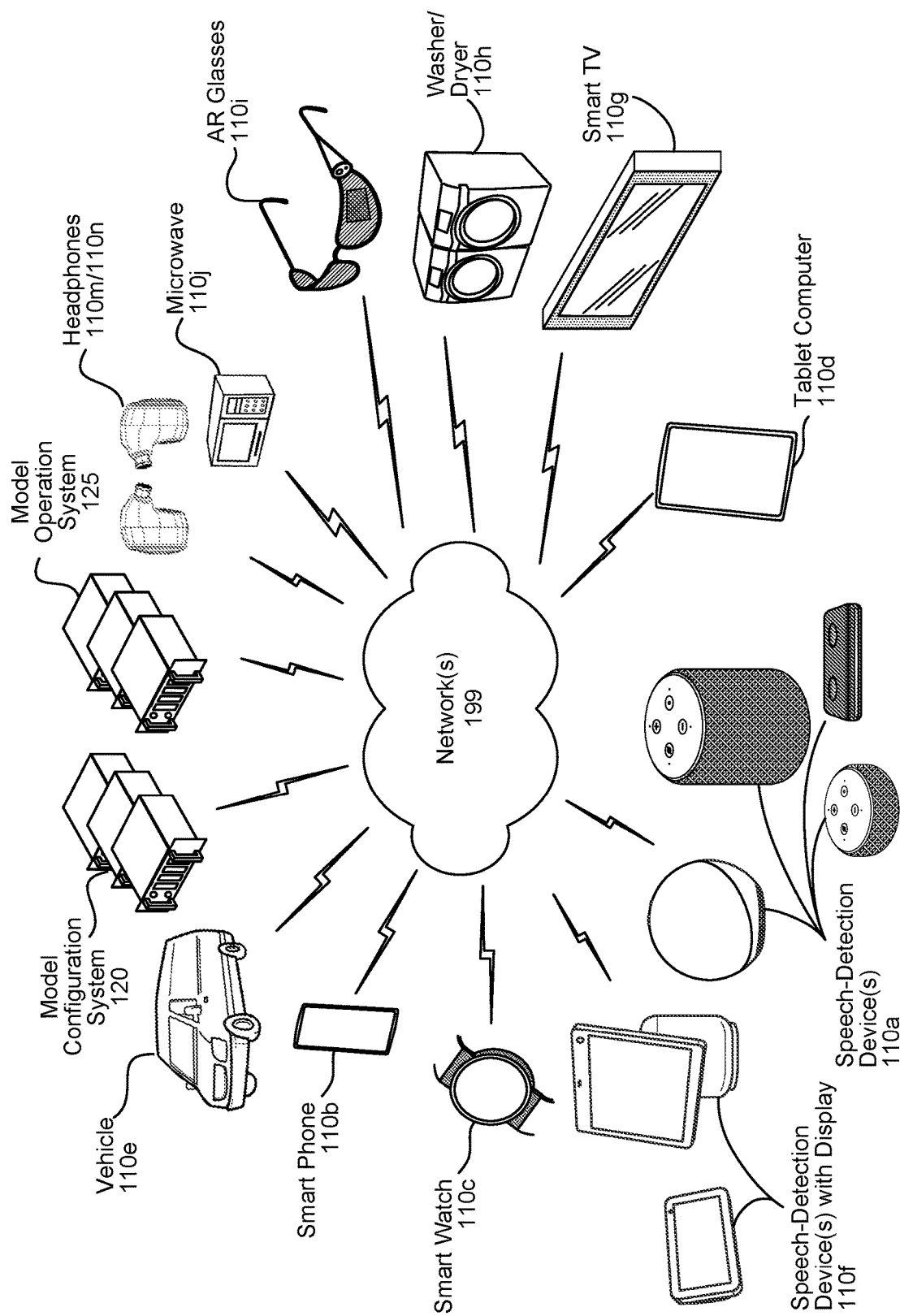
FIG. 12 illustrates an example of a computer network for use with the overall system, according to embodiments of the present disclosure.

As illustrated in FIG. 12, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, augmented reality (AR) glasses 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the model configuration component(s) (s) 120, the model operation component(s) (s) 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   determining signature data representing version information about a machine learning model;
   configuring the machine learning model to perform a function, wherein the machine learning model is configured to, in response to processing input data, generate output data including the signature data and results data representing a result of performance of the function with respect to the input data, wherein configuring the machine learning model comprises configuring a plurality of weights between nodes of the machine learning model and configuring a first plurality of nodes of an output layer of the machine learning model such that the machine learning model is configured to output values corresponding to the signature data, independent of the input data processed by the machine learning model, wherein configuring the plurality of weights comprises:
      determining a plurality of connections between the first plurality of nodes and a second plurality of nodes of a penultimate layer of the machine learning model,
      determining at least one weight corresponding to at least one connection of the plurality of connections, and
      setting the at least one weight to have a value of zero;
   sending, from a first device to a second device, first input data to be processed by an instance of the machine learning model;
   receiving, by the first device, first model output data corresponding to results of performance of the function with respect to the first input data;
   processing, by the first device, the first model output data to determine a portion of the first model output data potentially corresponding to the signature data; and
   processing, by the first device, the signature data to determine the version information.

2. A computer-implemented method, comprising:
   determining first data representing information to be used to identify a machine learning model; and
   configuring the machine learning model to perform a function, wherein the machine learning model is configured to, in response to processing input data, generate output data including the first data and results data representing a result of performance of the function with respect to the input data, wherein configuring the machine learning model comprises configuring at least (A) a first node of an output layer of the machine learning model and (B) a first weight between nodes of the machine learning model, such that the machine learning model is configured to output values corresponding to the first data, independent of the input data processed by the machine learning model, wherein configuring the first weight comprises:
      determining a connection between a first node of an output layer and a second node of a penultimate layer of the machine learning model, and
      setting a value of a weight corresponding to the connection to zero.

3. The computer-implemented method of claim 2, wherein the first node corresponds to a least-significant bit of the output layer.

4. The computer-implemented method of claim 2, wherein:
   the first data corresponds to information representing an author entity of the machine learning model and a version of the machine learning model.

5. The computer-implemented method of claim 2, wherein:
   the first data corresponds to a first plurality of bits of the output data;
   the results data corresponds to a second plurality of bits of the output data; and
   the second plurality of bits are more significant bits than the first plurality of bits.

6. A system comprising:
   at least one processor; and
   at least one memory including instructions that, when executed by the at least one processor, cause the system to:
      determine first data representing information to be used to identify a machine learning model; and
      configure the machine learning model to perform a function, wherein the machine learning model is configured to, in response to processing input data, generate output data including the first data and results data representing a result of performance of the function with respect to the input data, wherein the machine learning model is configured at least in part by configuring at least (A) a first node of an output layer of the machine learning model and (B) a first weight between nodes of the machine learning model, such that the machine learning model is configured to output values corresponding to the first data, independent of the input data processed by the machine learning model, wherein configuring the first weight comprises:
         determining a connection between a first node of an output layer and a second node of a penultimate layer of the machine learning model, and
         setting a value of a weight corresponding to the connection to zero.

7. The system of claim 6, wherein the first node corresponds to a least-significant bit of the output layer.

8. The system of claim 6, wherein:
the first data corresponds to a first plurality of bits of the output data;
the results data corresponds to a second plurality of bits of the output data; and
the second plurality of bits are more significant bits than the first plurality of bits.

9. The system of claim 6, wherein:
the first data corresponds to information representing an author entity of the machine learning model and a version of the machine learning model.

\* \* \* \* \*